(12) United States Patent  
Becker

(10) Patent No.: US 11,012,273 B1  
(45) Date of Patent: May 18, 2021

(54) COMPENSATING FOR FREQUENCY-DEPENDENT I-Q PHASE IMBALANCE

(71) Applicant: Hughes Network Systems, LLC, Germantown, MD (US)

(72) Inventor: Neal D. Becker, Germantown, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

(21) Appl. No.: 16/731,539

(22) Filed: Dec. 31, 2019

(51) Int. Cl.  
*H04B 1/16* (2006.01)  
*H04L 27/227* (2006.01)

(52) U.S. Cl.  
CPC ............ *H04L 27/227* (2013.01); *H04B 1/16* (2013.01)

(58) Field of Classification Search  
CPC ................................ H04L 27/227; H04B 1/16  
See application file for complete search history.

(56) References Cited

U.S. PATENT DOCUMENTS

| | | |
|---|---|---|
| 6,009,317 A | 12/1999 | Wynn |
| 6,330,290 B1 | 12/2001 | Glas |
| 6,670,900 B1 | 12/2003 | Zhang et al. |
| 6,823,181 B1 | 11/2004 | Kohno et al. |
| 7,035,341 B2 | 4/2006 | Mohindra |
| 7,158,586 B2 | 1/2007 | Husted |
| 7,170,411 B2 | 1/2007 | Thompson et al. |
| 7,310,388 B2 | 12/2007 | Koskela et al. |
| 7,515,650 B1 | 4/2009 | Warner et al. |
| 7,570,923 B2 | 8/2009 | Kiss et al. |
| 7,653,164 B2 | 1/2010 | Lin et al. |
| 8,218,687 B2 | 7/2012 | Sayers |
| 8,233,524 B2 | 7/2012 | Thirumoorthy |
| 8,290,458 B2 | 10/2012 | Safavi |

(Continued)

FOREIGN PATENT DOCUMENTS

| | | |
|---|---|---|
| CN | 104639490 | 5/2015 |
| CN | 106656902 | 2/2020 |

(Continued)

OTHER PUBLICATIONS

PCT International Search Report and Written Opinion in International Appln. No. PCT/US2020/066338, dated Mar. 17, 2021, 14 pages.

*Primary Examiner* — Dac V Ha  
(74) *Attorney, Agent, or Firm* — Fish & Richardson P.C.

(57) ABSTRACT

Methods, systems, and apparatus, including computer programs encoded on computer-storage media, for compensating for frequency-dependent I-Q imbalance. In some implementations, a radio receiver includes an in-phase mixer configured to generate an in-phase (I) signal and a quadrature mixer configured to generate a quadrature (Q) signal. A first analog-to-digital (A/D) converter is configured to generate first digital samples from one of the I signal and the Q signal. A second analog-to-digital (A/D) converter is configured to generate second digital samples from the other of the I signal and the Q signal. A compensation system includes a feedback loop configured to compensate for frequency-dependent I-Q imbalance based on results, for each of multiple of the first digital samples, of cross-correlation of the first digital sample with each of multiple of the second digital samples.

22 Claims, 5 Drawing Sheets

(56) References Cited

U.S. PATENT DOCUMENTS

| | | | |
|---|---|---|---|
| 8,311,083 B2 | 11/2012 | Ding et al. | |
| 8,331,506 B2 | 12/2012 | Park et al. | |
| 8,379,767 B2 | 2/2013 | Zhu | |
| 8,437,430 B2 | 5/2013 | Guo et al. | |
| 8,565,352 B2 | 10/2013 | Park et al. | |
| 8,737,533 B2 | 5/2014 | Andgart et al. | |
| 8,971,465 B2 | 3/2015 | Varanese et al. | |
| 9,148,328 B2 | 9/2015 | Zhang et al. | |
| 9,203,682 B2 | 12/2015 | Winzer et al. | |
| 9,231,839 B1 | 1/2016 | Chen et al. | |
| 9,372,663 B2 | 6/2016 | Azadet | |
| 9,680,674 B2 | 6/2017 | Ling et al. | |
| 2003/0165203 A1 | 9/2003 | Mohindra | |
| 2006/0039506 A1 | 2/2006 | D'Alessandro | |
| 2007/0058755 A1* | 3/2007 | Husted | H04L 27/3863 375/332 |
| 2007/0195867 A1* | 8/2007 | Betz | H04B 1/70752 375/152 |
| 2009/0116586 A1* | 5/2009 | Arambepola | H04B 1/30 375/324 |
| 2010/0067622 A1 | 5/2010 | Komaili et al. | |
| 2011/0069744 A1 | 3/2011 | Laudel et al. | |
| 2012/0039375 A1 | 2/2012 | Eitel | |
| 2013/0287082 A1 | 10/2013 | Chen et al. | |
| 2014/0362955 A1* | 12/2014 | Muhammad | H04B 1/16 375/343 |
| 2014/0376651 A1 | 12/2014 | Khoury et al. | |
| 2015/0117577 A1* | 4/2015 | Valadon | H04B 1/1027 375/350 |
| 2015/0200628 A1* | 7/2015 | Rutten | H04L 27/3863 455/326 |
| 2015/0222309 A1* | 8/2015 | Onishi | H04B 1/123 375/350 |
| 2017/0126465 A1 | 5/2017 | Kim et al. | |

FOREIGN PATENT DOCUMENTS

| | | |
|---|---|---|
| WO | WO2005029798 | 3/2005 |
| WO | WO 2005067250 | 7/2005 |

* cited by examiner

COMPENSATING FOR FREQUENCY-DEPENDENT I-Q PHASE IMBALANCE

TECHNICAL FIELD

The present specification relates to improving the reception performance of receivers by compensating for frequency-dependent I-Q phase imbalance.

BACKGROUND

Some digital receivers use I/Q mixers for an interface between analog and digital domains, for example, to receive signals transmitted with quadrature modulation. An analog input signal to the receiver at some input frequency is input to a pair of mixers operating in quadrature, which is referred to as in-phase (I) and quadrature (Q) mixers. The outputs of each these I and Q mixers are then sampled by a pair of analog to digital converters (A/D converters). These two digital streams are the I and Q inputs to the digital processing.

The performance of the receiver depends in part on the quality of these mixers. One important aspect is that the mixers, which are supposed to be operating with a 90 degree phase difference, are indeed maintaining this 90 degree phase difference. Deviation from the 90 degree phase difference is referred to as I-Q phase imbalance. The presence of an I-Q phase imbalance can limit the reception performance of the receiver.

SUMMARY

In some implementations, a communication system includes features to improve the reception performance of receivers by compensating for frequency-dependent I-Q phase imbalance. In general, the I-Q phase imbalance can be caused by the mixers of a receiver, the signal paths of the I and Q signals, filters of the receiver, and/or other sources. A phase imbalance between the I and Q branches causes crosstalk between the I and signals. This crosstalk can be measured by determining a correlation between the I and Q samples.

In some cases, such as in broadband systems that are configured to operate over a range of different carrier frequencies, the I-Q phase imbalance can be frequency-dependent. In such cases, the phase shift between the I and Q signals can be a function of frequency and different signal components that have different frequencies can have different phase shifts between the I and Q signals. If the I-Q phase imbalance has a frequency dependence, then not only are I and Q correlated, but each sample of one of the signals (e.g., $i_n$) may be correlated with multiple samples at different time indices of the other signal (e.g., $q_{n+k}$ for multiple values of k), where the subscript indicates the time index of the samples. The result of this is that a portion of the sample (e.g., $i_n$) contains some added portion of sample (e.g., $q_{n+1}$), another (different) portion of (e.g., $q_{n+2}$), and so on.

As described in this document, a compensation system can compensate for the frequency-dependent phase imbalance using a control loop (e.g., a feedback loop or feedforward loop) that determines a correlation between each of multiple samples of a first of the signals (e.g., one of the I signal or the Q signal) with multiple samples of a second of the signals (e.g., the other of the I signal or the Q signal). In particular, the control loop can cross-correlate each sample of the first signal with multiple samples of the second signal within a limited window. The window can be a sliding window that is based on a time index of the sample of the first signal. The window may be defined to cover, for example, a range of time or a number of samples. For example, a window size of 6 samples can be used. The control loop can cross-correlate the sample in of the I signal (e.g., the I sample having a time index of n) with each sample in a series of consecutive samples of the Q signal, e.g., each sample in a window of a predetermined size (e.g., a 6-sample window) that begins at time index n. In this example, the control loop can cross-correlate the sample in with each of the samples $q_n$, $q_{n+1}$, $q_{n+2}$, $q_{n+3}$, $q_{n+4}$, and $q_{n+5}$.

This approach performs multiple cross-correlation operations for each time index n, e.g., a separate cross-correlation for in with respect to each of the samples $q_{n+k}$. The control loop can include, for each second sample (e.g., $q_{n+k}$), a correlator stage that determines an approximate cross-correlation between the first sample (e.g., in) and the second sample (e.g., $q_{n+k}$). This approximate cross-correlation represents the extent that the second signal (e.g., the Q signal) is correlated with the first signal (e.g., the I signal) for the time index of the sample of the second signal.

The control loop can aggregate the approximate cross-correlation results for each of the second samples and adjust the I signal based on the aggregated cross correlation results to compensate for the frequency-dependent I-Q phase imbalance, resulting in better receiver performance. In this way, the control loop works to learn and compensate for the amount of I-Q phase imbalance that is currently present in the current circumstances.

Using a control loop, the compensation system can adjust to compensate for changes in frequency-dependent I-Q phase imbalance caused by any source. For example, the control loop can adjust the error signals to compensation for changes in I-Q phase imbalance caused by changes in carrier frequency, changes in temperature, changes in the physical channel, etc. The compensation system does not need to be informed of the frequency used and can automatically adjust for any of the frequencies, e.g., using the control loop to determine the cross-correlation results caused by the change in frequency and adjusting the first signal based on the cross-correlation results.

The control loop can learn the cross correlation results for each time index of the second samples over a short period time to converge on, or near, a 90-degree phase difference between the I signal and the Q signal for each signal component. In this way, the receiver can quickly adapt to changes in the RF frequency or other source of varying phase shifts versus frequency which, as described above, can result in different I-Q phase imbalance.

The compensation systems for compensating for frequency-dependent I-Q phase imbalance can be implemented using low-complexity designs. A few multiplications and additions can be used to compensate for I-Q phase imbalance at a single time instant. To compensate for frequency-dependent I-Q phase imbalance over L time instances, the complexity is only increased by a factor of L, which is typically not large.

In one general aspect, the systems and techniques disclosed herein describe radio receivers configured to compensate for frequency-dependent I-Q phase imbalance. According to some aspects, a radio receiver includes an in-phase mixer configured to generate an in-phase (I) signal; a quadrature mixer configured to generate a quadrature (Q) signal; a first analog-to-digital (A/D) converter configured to generate first digital samples from one of the I signal and the Q signal; a second analog-to-digital (ND) converter configured to generate second digital samples from the other of the I signal and the Q signal; and a compensation system comprising a control loop configured to compensate for frequency-dependent I-Q imbalance that varies across input signal component frequencies based on results, for each of multiple of the first digital samples, of cross-correlation of the first digital sample with each of multiple of the second digital samples.

Implementations can include one or more of the following features. In some implementations, the control loop includes a feedforward loop or a feedback loop. The control loop can include multiple correlator stages. Each correlator stage can generate a cross-correlation result by cross-correlating the first digital sample with a respective second digital sample of the multiple second digital samples.

In some implementations, each correlator stage includes a first mixer configured to generate a product of one of the first digital sample and the respective second digital sample. Each correlator stage can include a control element configured to generate the cross-correlation result, including integrating multiple of the products generated by the first mixer over time and a second mixer configured to generate an adjusted second digital sample by multiplying the cross-correlation result by the second digital sample.

In some implementations, the control loop includes an aggregation element configured to aggregate a respective adjusted second digital sample received from each correlator stage and an adjustment element configured to adjust the I signal or the Q signal based on the aggregated adjusted second digital samples.

In some implementations, the control loop is configured to cross-correlate the first digital sample with the multiple second digital samples. The multiple second digital samples can include a proper subset of the second digital samples. The proper subset can have no more than a maximum number of second digital samples and the second proper subset can be based on a time index of the first digital sample. The correlator stages can include a respective correlator stage for each second digital sample in the proper subset.

In some implementations, the control loop is configured to adjust a phase difference between the I signal and the Q signal to reduce deviation in the phase difference from 90 degrees. The compensation system can be configured to apply different compensation for different carrier frequencies. In some implementations, the control loop is configured to adapt to changes in I-Q imbalance due to changes in temperature.

In some implementations, the radio receiver is configured to change a frequency to which the radio receiver is tuned. The change in frequency causes a change in the I-Q imbalance. The control loop is configured to compensate for the changed I-Q imbalance based on additional results, for each of multiple additional first digital samples, of cross-correlation of the first additional sample with each of multiple additional second digital samples.

In another general aspect, the systems and techniques disclosed herein describe methods of compensating for frequency-dependent I-Q phase imbalance. According to some of the methods, an input signal is received. An in-phase (I) signal is generated from the input signal and a quadrature (Q) signal is generated from the input signal. First digital samples are obtained from one of the I signal and the Q signal. Second digital samples fare obtained from the other of the I signal and the Q signal. Frequency-dependent I-Q imbalance is compensated for by determining, for each of multiple of the first digital samples, cross-correlations of the first digital sample with respect to each of multiple of the second digital samples, operating a control loop based on the cross-correlations, and adjusting the I signal or the Q signal based on the control loop.

In some implementations, compensating for frequency-dependent I-Q imbalance can include operating the control loop to adjust a phase difference between the I signal and the Q signal to reduce deviation in the phase difference from 90 degrees.

In some implementations, compensating for the frequency-dependent I-Q imbalance can include cross correlating the first digital samples with each of a proper subset of the second digital samples. The proper subset of the second digital samples has no more than a maximum number of second digital samples, and the proper subset of the second digital samples is based on a time index of the first digital sample.

In some implementations, the first digital samples are respectively cross-correlated with samples in different proper subsets of the second digital samples, each of the proper subsets having a same predetermined number of samples.

In some implementations, compensating for the frequency-dependent I-Q imbalance can include cross correlating each of the first digital samples with the second samples in a limited window corresponding to the first digital sample. The limited window has a position based on a time index of the first digital sample.

In some implementations, compensating for the frequency-dependent I-Q imbalance can include correlating a first digital sample having a particular time index with each second digital sample in a series of consecutive second digital samples in a range based on the particular time index.

In some implementations, compensating for the frequency-dependent I-Q imbalance can include correlating a first digital sample having a particular time index with a predetermined number of second digital samples in sequence beginning at the particular time index.

Other embodiments include corresponding systems, apparatus, and software programs, configured to perform the actions of the methods, encoded on computer storage devices. For example, some embodiments include a satellite terminal and/or a satellite gateway configured to perform the actions of the methods. A device or system of devices can be so configured by virtue of software, firmware, hardware, or a combination of them installed so that in operation cause the system to perform the actions. One or more software programs can be so configured by virtue of having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
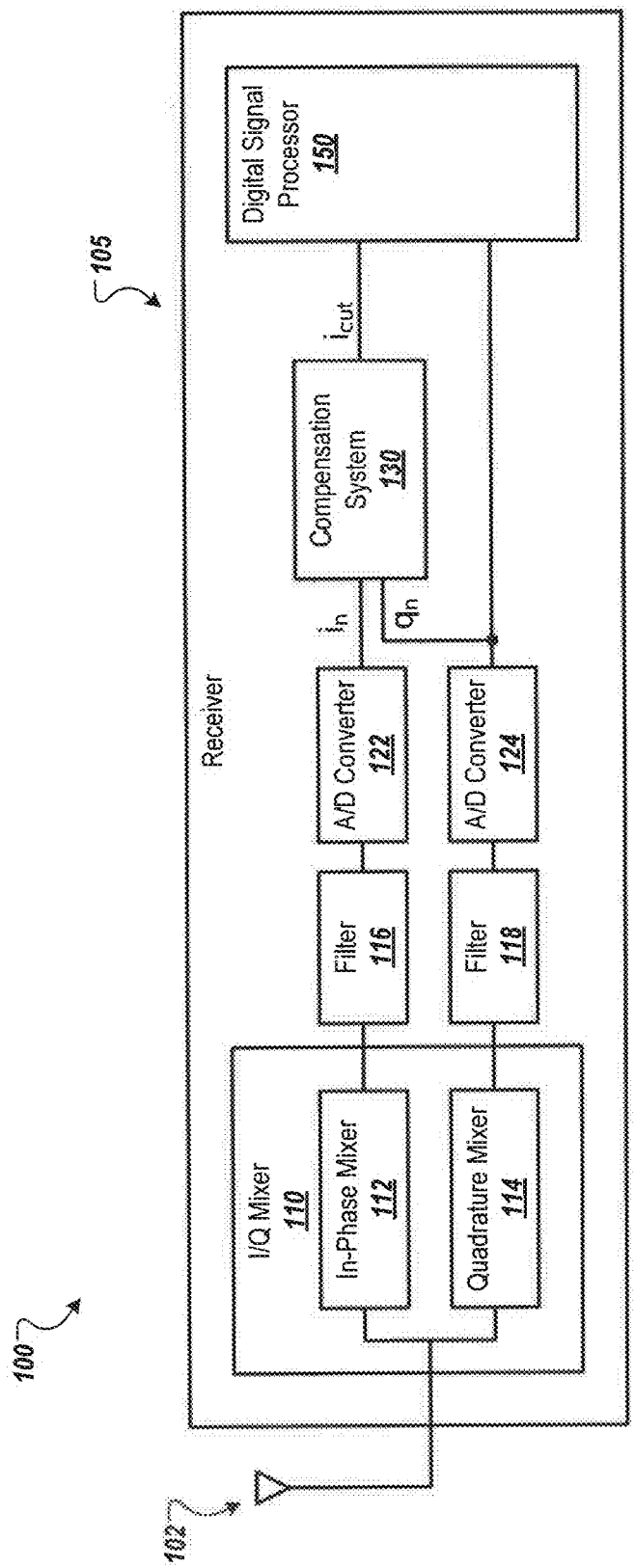
FIG. 1A is a diagram of a system that includes an example radio receiver that includes a compensation system that is capable of compensating for frequency-dependent I-Q phase imbalance.

FIG. 1A is a diagram of a system 100 that includes an example radio receiver 105 that includes a compensation system 130 that is capable of compensating for frequency-dependent I-Q phase imbalance. The system 100 also includes an antenna 102 that can transmit and receive signals, e.g., RF signals.

The receiver 105 includes an in-phase quadrature (I/Q) mixer 110 that provides an interface between analog and digital domains. The I/Q mixer 110 can downconvert received RF signals to in-phase and quadrature intermediate frequency (IF) signals. In particular, the I/Q mixer 110 includes an in-phase mixer 112 that is configured to generate the in-phase (I) signal and a quadrature mixer 114 that is configured to generate the quadrature (Q) signal.

The in-phase mixer 112 can generate the I signal by combining the RF signal with a first local oscillator signal, e.g., by generating the product of the first local oscillator signal and the RF signal. The quadrature mixer 114 can generate the Q signal by combining a second local oscillator signal that is offset by 90 degrees from the first local oscillator signal with the RF signal, e.g., by generating the product of the second local oscillator signal and the RF signal.

The receiver 105 also includes filters 116 and 118. The filters 116 and 118 can be implemented as low-pass filters or band-pass filters that filter the frequencies outside of the baseband frequency range. For example, the output of the mixers 112 and 114 can include a baseband signal centered at a frequency of zero hertz (Hz) and a sum signal at a frequency of twice the carrier frequency. The filters 116 and 118 can block the sum signals and pass the baseband signals.

The receiver 105 include a first analog to digital (A/D) converter 122 that is configured to generate digital samples from the I signal (I samples). The receiver 105 also includes a second A/D converter that is configured to generate digital samples from the Q signal (Q samples).

The receiver 105 also includes a compensation system 130 that is configured to compensate for I-Q phase imbalance between the I signal and the Q signal. In particular, the compensation system 130 is configured to compensate for frequency-dependent I-Q phase imbalance between the I signal and the Q signal. In this example, the compensation system 130 is arranged in the receiver 105 to adjust the I signal to compensate for the frequency-dependent I-Q imbalance. In other examples, the compensation system 130 is arranged in the receiver 105 to adjust the Q signal to compensate for the frequency-dependent I-Q imbalance.

In general, the compensation system 130 includes a control loop that is configured to compensate for the frequency-dependent I-Q imbalance based on results, for each of multiple first digital samples, of cross-correlation of the first digital sample with each of multiple second digital samples. The first digital samples can be the I samples or the Q samples. The second digital samples can be the other of the I samples or the Q samples. In the illustrated example, the first digital samples are the I samples and the second digital samples are the Q samples. For implementations in which the first digital samples are the Q samples and the second digital samples are the I samples, the output of the in-phase mixer 112 can be connected to the input of the A/D converter 124 and the output of the quadrature mixer 114 can be connected to the output of the A/D converter 122.

In this example, for each I sample, the compensation system 130 cross-correlates the I sample with multiple Q samples. The compensation system can cross-correlate the I sample with the Q sample having the same time index as the I sample and one or more additional Q samples having a different time index than the I sample. The time index can represent a time at which the sample was generated by one of the A/D converters 122 or 124.

In some implementations, the compensation system 130 cross-correlates each I sample with a proper subset of the Q samples. A proper subset of a set of Q samples includes one or more of the Q samples, but fewer than all of the Q samples. The subset of Q samples can include a predetermined number "L" of Q samples or up to a maximum of L samples.

The subset of Q samples can be based on a time index of the I sample. For example, the subset of Q samples can be the Q samples within a limited window that has a position based on the time index of the I sample. The window can be a sliding window that is based on a time index of the I sample. The window may be defined to cover, for example, a range of time or a number of samples. The window can include Q samples that were generated before the I sample and/or Q samples that were generated after the I sample.

For example, a window of five samples can be used. The window can begin at or before the time index n of the I sample. In one example, the subset can include the Q samples $q_{n-4}$, $q_{n-3}$, $q_{n-2}$, $q_{n-1}$, and qn. In another example, the window can include the Q samples $q_{n-2}$, $q_{n-1}$, $q_n$, $q_{n+1}$, and $q_{n+2}$. In another example, the window can include the Q samples $q_n$, $q_{n+1}$, $q_{n+2}$, $q_{n+3}$, and $q_{n+4}$. The number of Q samples and the size and position of the window can vary in different implementations.

The cross-correlation between the I sample and each Q sample in the subset of Q samples can produce a cross-correlation result. As described below, the cross-correlation result for the I sample and a given Q sample can be an approximation of the correlation between the I sample and the given Q sample based on the integration of the product of the I sample and the Q sample over multiple time instances. The cross-correlation result for a given Q sample represents an extent that the Q signal at the time index corresponding to the given Q sample is correlated with the I signal, e.g., due to crosstalk between the I and Q signals. The cross-correlation results corresponds to the phase imbalance between the I and Q signals because the imbalance causes the crosstalk between the I and Q signals. The compensation system 130 can adjust the I signal based on the cross-correlation results to reduce the deviation in the phase difference from 90 degrees. The compensation system 130 is described in more detail below with reference to FIG. 1B.

The receiver 105 also includes a digital signal processor 150. The digital signal processor 150 receives the I samples and the Q samples and further processes the samples. The digital signal processor 150 can be used for one or more of various digital signal processing applications.

Figure 1B:
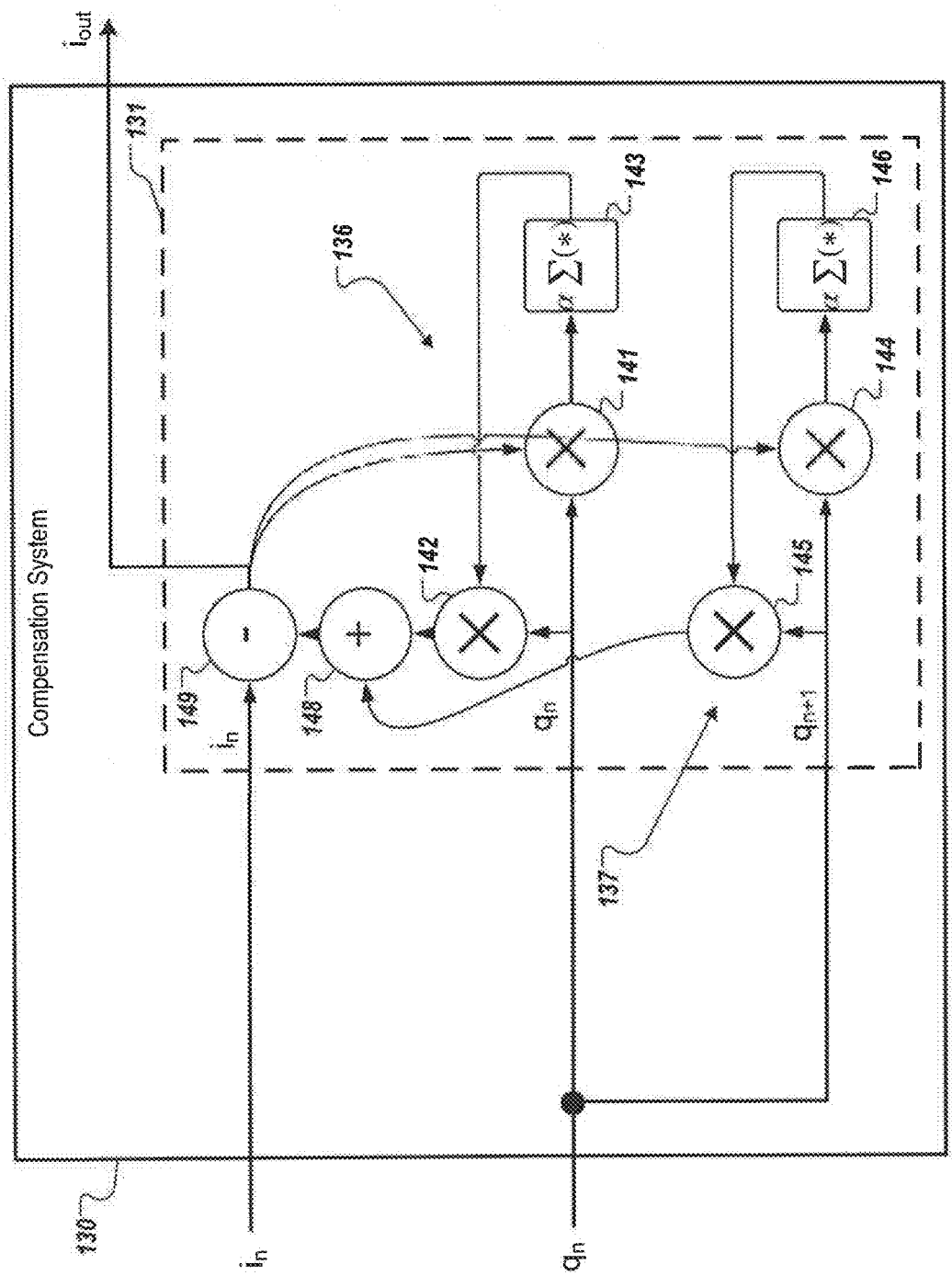
FIG. 1B is a diagram of the compensation system of FIG. 1B.

FIG. 1B is a diagram illustrating the compensation system 130 of FIG. 1B in more detail. The compensation system can be implemented in either a feedforward or feedback structure. In a feedforward structure, the compensation system would measure the crosstalk between the I input and Q input, and determine what portion of Q to subtract from I, for example. In this example, the compensation system 130 is implemented as in a feedback structure. In particular, the compensation system 130 is implemented as a first order feedback structure. In a feedback structure, the compensation system 130 measures the crosstalk between the corrected I output (also referred to as an adjusted I sample) and the Q input, which would reflect the residual error that remains uncorrected.

As described above, in this example, the first digital samples are the I samples and the second digital samples are the Q samples. However, the compensation system 130 can be configured such that the first digital samples are the Q samples and the second digital samples are the I samples. Thus, in the discussion below, the I samples and the Q samples could be interchanged.

The compensation system 130 receives I samples and Q samples output by the A/D converters 122 and 124, respectively, for each time index "n." For example, the compensation system 130 can receive each I sample and each Q sample generated by the A/D converters 122 and 124, or at least a portion of the I samples and Q samples. The I sample for time index n is referred to as $i_n$ and the Q sample for time index n is referred to as $q_n$.

The compensation system 130 includes a feedback loop 131 that is configured to compensate for frequency-dependent I-Q imbalance based on the I samples and the Q samples. The feedback loop 131 includes a respective correlator stage for each of the multiple Q samples with which each I sample is cross-correlated. In this example, the feedback loop 131 includes a first correlator stage 136 that determines, for each I sample, a first cross-correlation result by cross-correlating the I sample with the Q sample having the same time index as the I sample. In other words, the first correlator stage 136 cross-correlates each $i_n$ sample with the $q_n$ sample having the same time index n.

The feedback loop 131 also includes a second correlator stage 137 that determines, for each I sample, a second cross-correlation result by cross-correlating the I sample with the Q sample having a time index of n+1. The time index n+1 represents a sample generated one sample after the sample at time n. The unit of time is the amount of time between successive samples. For example, if the A/D converters 122 and 124 generate a digital sample each second, the time index n+1 would represent the time index for the sample generated one second after time n. Thus, the second cross-correlation result represents the correlation, e.g., an approximation of the correlation, between $i_n$ and $q_{n+1}$.

Although the example feedback loop 131 includes two correlator stages 136 and 137, other numbers of correlator stages are also possible. For example, the feedback loop 131 can include a respective correlator stage for each Q sample in the proper subset of Q samples. That is, the feedback loop 131 can include a respective correlator stage for each of the multiple Q samples with which each I sample will be cross-correlated. If the proper subset includes eleven Q samples from n−5 to n+5, the feedback loop 131 can include a correlator for each Q sample from n−5 to n+5.

The first compensator stage 136 is arranged as a first order feedback control loop that includes a first mixer 141, a second mixer 142, and a control element 143. In some implementations, the first compensator stage 136 (and each other compensator stage) can be arranged as a higher order control loop (e.g., a second order control loop). Indeed, any well-known control loop structure could be used. Alternatively, a feedforward compensation structure could be used, which is not described further herein but should be evident to those skilled in the art. The first compensator stage 136 is configured to generate, for each in sample, a first cross-correlation result that represents the correlation between an adjusted $i_n$ sample and a corresponding $q_n$ sample having the same time index as the in sample. The first cross-correlation result can represent an approximate correlation between the adjusted $i_n$ sample and the corresponding $q_n$ sample having the same time index as the adjusted in sample. The adjusted $i_n$ sample is the output of an adjustment element 149 described below.

The first mixer 141 can generate a product of the two digital samples, i.e., the adjusted $i_n$ sample and the $q_n$ sample. This product represents an error signal, e.g., the residual error, for the two samples.

The control element 143 receives the error signal for each in sample. The control element 143 can use the error signals to determine the first cross-correlation result for the in and $q_n$ samples. This first cross-correlation result is a value that is applied to, e.g., multiplied by, the $q_n$ sample, and the product is then used to adjust the in sample, as described below. The control element 143 can adjust the first cross-correlation result based on feedback to reduce the I-Q phase imbalance caused by the portion of the Q signal having the same time index as the I signal. This feedback is in the form of subsequently received error signals for the in and $q_n$ samples from the mixer 141.

In some implementations, the control element 143 includes an integration element that integrates (e.g., determines the sum of) the error signals over time to approximate the correlation between the in and $q_n$ samples. To determine the first cross-correlation result, the control element 143 can apply a gain a to the integration result. The gain a of each compensator stage can be selected or otherwise configured based on the desired convergence speed and the amount of acceptable noise. The control element 143 can re-compute the first cross-correlation result for each $i_n$ sample. The control element 143 can adjust, as the result of the integration, the first cross-correlation result over time until first cross-correlation result converges to the amount of the Q signal having the same time index as the I signal that is imposed on the I signal. At this point, the error signal output by the mixer 141 will be zero or approximately zero. When this value is multiplied by a $q_n$ sample and this product is removed from the I signal, then this portion of the Q signal is removed from the I signal, resulting in less deviation from a 90 degree phase shift between the I and Q signals.

The second mixer 142 can generate a product of the $q_n$ sample and the first cross-correlation result at time n. The second mixer 142 outputs this product to an aggregation element 148, which uses the product to generate an aggregate value that is, in turn, used to adjust the $i_n$ sample.

The second compensator stage 137 is also arranged as a first order feedback control loop that includes a first mixer 144, a second mixer 145, and a control element 146. The second compensator stage 137 is configured to generate, for each $i_n$ sample, a second cross-correlation result that represents the correlation between an adjusted $i_n$ sample and a corresponding $q_{n+1}$ sample having time index that is one sample after the $i_n$ sample. The second cross-correlation result can represent an approximate correlation between the adjusted $i_n$ sample and the corresponding $q_{n+1}$ sample. The adjusted $i_n$ sample is the output of the adjustment element 149 described below.

The first mixer 144 can generate a product of the two digital samples, i.e., the adjusted $i_n$ sample and the $q_{n+1}$ sample. This product represents an error signal, e.g., the residual error, for the two samples.

The control element 146 receives the error signal for each $i_n$ sample. The control element 146 can use the error signals to determine the second cross-correlation result for the $i_n$ and $q_{n+1}$ samples. This second cross-correlation result is a value that is applied to, e.g., multiplied by, the $q_{n+1}$ sample, and the product is then used to adjust the $i_n$ sample, as described below. The control element 146 can adjust the second cross-correlation result based on feedback to reduce the I-Q phase imbalance caused by the portion of the Q signal having the same time index n+1. This feedback is in the form of subsequently received error signals for the $i_n$ and $q_{n+1}$ samples from the mixer 144.

In some implementations, the control element 146 includes an integration element that integrates (e.g., determines the sum of) the second cross-correlation results over a given time period. To determine the error signal, the control element 143 can apply a gain a to the integration result. The control element 143 can determine the error signal for each $i_n$ sample. The control element 146 can adjust the error signal over time until there is no correlation (or at least less than a threshold correlation) between adjusted $i_n$ samples and $q_{n+1}$ samples. In this way, the error signal converges to a value that is proportional to the portion of the Q signal having a time index of n+1 relative to the I signal that is imposed on the I signal. When this value is multiplied by a $q_{n+1}$ sample and this product is removed from the I signal, then this portion of the Q signal is removed from the I signal, resulting in less deviation from a 90 degree phase shift between the I and Q signals.

In some implementations, the control element 146 includes an integration element that integrates (e.g., determines the sum of) the error signals over time to approximate the correlation between the $i_n$ and $q_{n+1}$ samples. To determine the second cross-correlation result, the control element 146 can apply a gain a to the integration result. The gain a of each compensator stage can be selected or otherwise configured based on the desired convergence speed and the amount of acceptable noise. The control element 146 can re-compute the second cross-correlation result for each $i_n$ sample. The control element 146 can adjust, as the result of the integration, the second cross-correlation result over time until second cross-correlation result converges to the amount of the Q signal having the time index n+1 that is imposed on the I signal. At this point, the error signal output by the mixer 144 will be zero or approximately zero. When this value is multiplied by a $q_{n+1}$ sample and this product is removed from the I signal, then this portion of the Q signal is removed from the I signal, resulting in less deviation from a 90 degree phase shift between the I and Q signals.

The second mixer 145 can generate a product of the $q_{n+1}$ sample and the error signal at time n. The second mixer 145 outputs this product to the aggregation element 148, which uses the product to generate an aggregate value that is, in turn, used to adjust the $i_n$ sample.

Although not shown, the compensation system 130 can include a tapped delay line to provide the Q samples at different time instances. This provides the Q samples for time indices other than n, e.g., n+1, n+2, etc.

The aggregation element 148 aggregates, e.g., determines the sum of, the adjusted Q samples output by each compensator stage. In this example, the aggregation element 148 aggregates the output of the first compensator stage 136 and the second compensator stage 137. For example, the aggregation element 148 can generate a sum of (i) adjusted $q_n$ sample and (ii) the adjusted $q_{n+1}$ sample. This sum represents the aggregate Q signal found on the I signal across each time index for which the Q signal is cross-correlated with the $i_n$ sample. If the feedback loop 131 includes additional compensator stages, the aggregation element 148 can aggregate the outputs of the additional compensator stages as well.

The feedback loop 131 also includes an adjustment element 149. The adjustment element adjusts each $i_n$ sample based on the aggregated adjusted Q samples output by the aggregation element 148. For example, the adjustment element 149 can adjust the $i_n$ sample by subtracting, from the $i_n$ sample, the aggregated adjusted Q samples output by the aggregation element 148. That is, the adjustment element 149 can remove the aggregated adjusted Q samples from the $i_n$ sample.

The feedback loop 131 can determine cross-correlation results for each $i_n$ sample and adjust each $i_n$ sample using the aggregated adjusted Q samples. In this way, the feedback loop 131 learns the cross-correlation for each time offset of the Q signal over a period of time until the error signals converge, as shown $i_n$ FIG. 4 and described below. That is, the feedback loop 131 learns, for each correlator stage, a cross-correlation result that is applied to the Q sample of the correlator stage such that, when the aggregated adjusted Q samples are removed from the I signal, the resulting I signal is 90 degrees offset (e.g., within some tolerance) of the Q signal.

The feedback loop 131 can keep operating in this manner even after convergence. In this way, the feedback loop 131 can compensate for changes in the I-Q phase imbalance caused by a change in the carrier frequency (the frequency of the input signal received by the antenna 102), a change in temperature, or other factor that changes the phase imbalance. For example, the receiver 105 can be tuned to a different carrier frequency. The feedback loop 131 can automatically detect any new I-Q imbalance based on the cross-correlation results and adjust the error signals until they converge for the new frequency.

Figure 2:
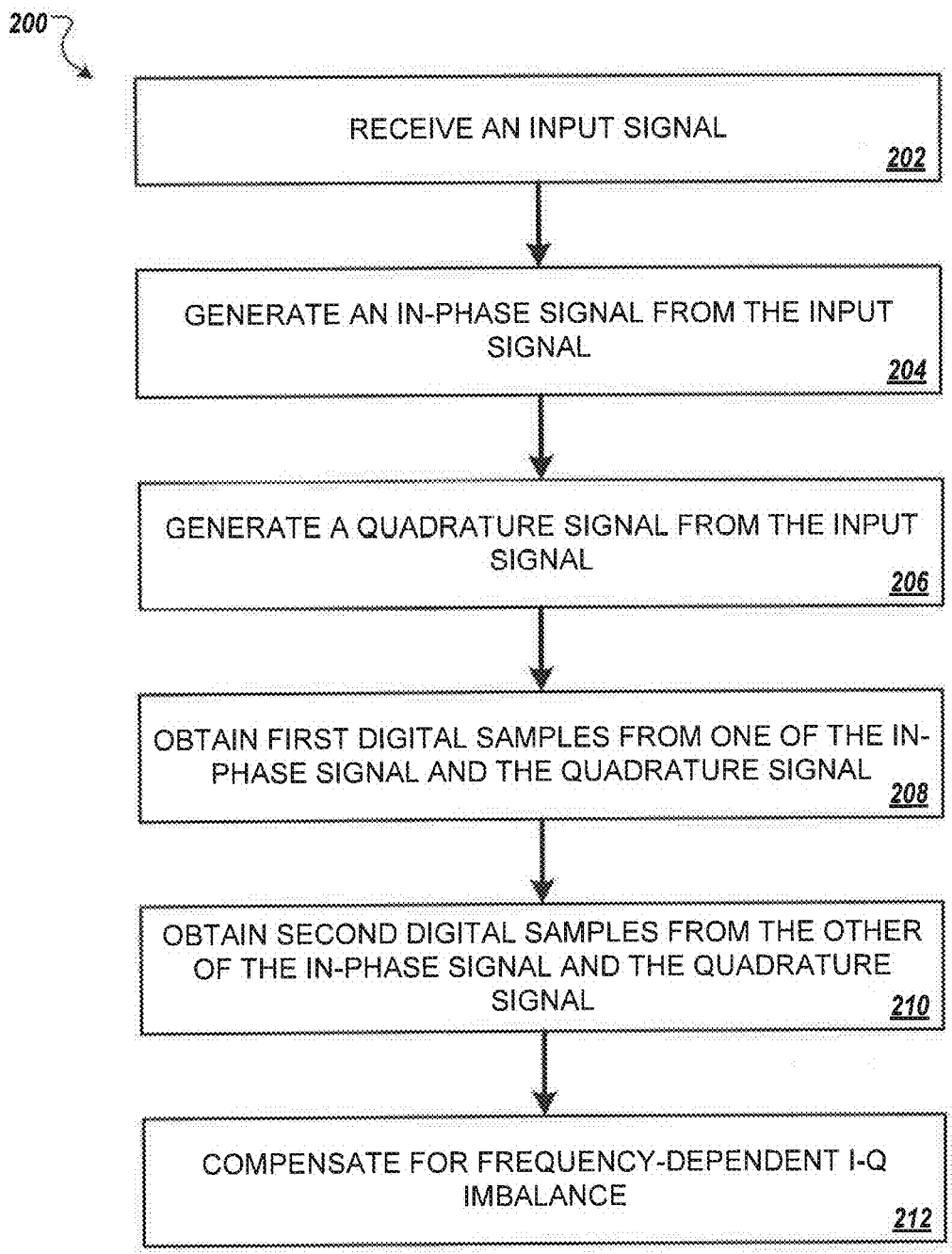
FIG. 2 is a flow diagram illustrating an example of a process for compensating for frequency-dependent I-Q phase imbalance.

FIG. 2 is a flow diagram illustrating an example of a process 200 for compensating for frequency-dependent I-Q phase imbalance. The process 200 can be performed by a receiver, e.g., the radio receiver 105 of FIG. 1A.

The receiver receives an input signal (202). The input signal can be an RF signal. For example, an antenna of a radio receiver can receive an RF signal.

The receiver generates an I signal from the input signal (204). For example, the receiver can include an I/Q mixer that generates the I signal by combining the input signal with a first local oscillator signal, e.g., by generating a product of the first local oscillator signal and the input signal.

The receiver generates a Q signal from the input signal (206). For example, the I/Q mixer can generate the Q signal by combining a second local oscillator signal with the input signal, e.g., by generating a product of the second local oscillator signal and the input signal. The second local oscillator signal can be offset by 90 degrees from the first local oscillator signal.

The receiver obtains first digital samples from one of the I signal or the Q signal (208). The receiver can include a first A/D converter that generates the first digital samples from either the I signal or the Q signal.

The receiver obtains second digital samples from the other of the I signal or the Q signal (210). The receiver can include a second A/D converter that generates the second digital samples from either the I signal or the Q signal. For example, if the first digital samples are generated from the I signal, then the second digital samples are generated from the Q signal. In another example, if the first digital samples are generated from the Q signal, then the second digital samples are generated from the I signal.

The receiver compensates for frequency-dependent I-Q imbalance between the I signal and the Q signal (212). The receiver can include a compensation system, e.g., the compensation system 130 of FIGS. 1A and 1B that compensates for the frequency-dependent I-Q imbalance. As described above, the compensation system can include a control loop (e.g., a feedback or feedforward loop) that compensates for the frequency-dependent I-Q imbalance. The compensation system can operate the control loop to compensate for the frequency-dependent I-Q imbalance, as described with reference to FIG. 3.

Figure 3:
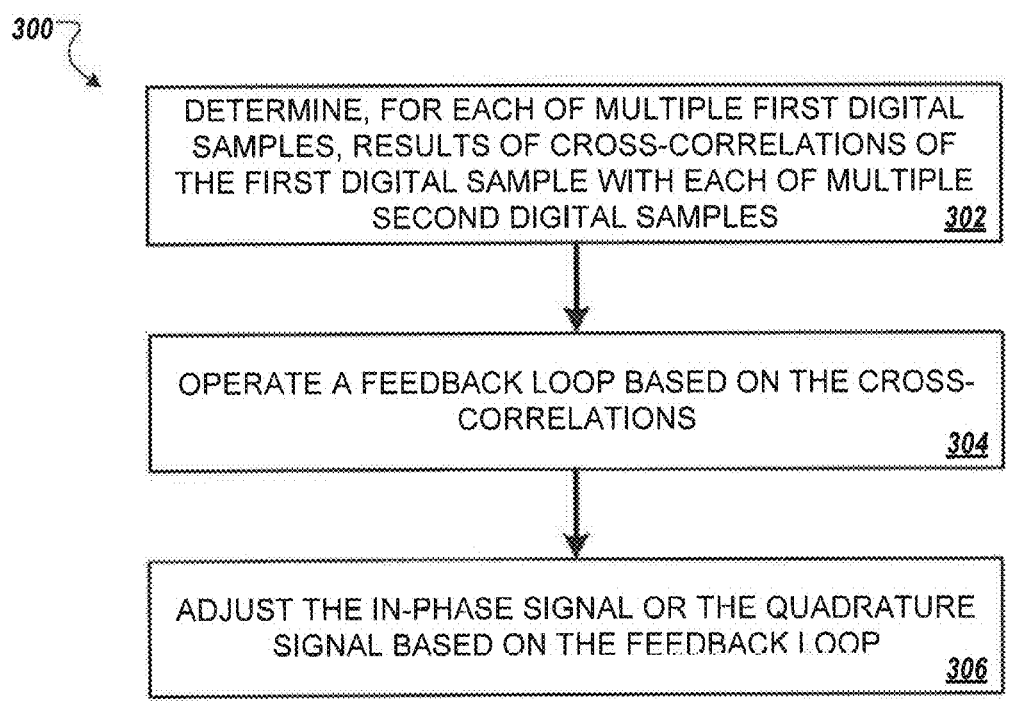
FIG. 3 is a flow diagram illustrating an example of a process for operating a control loop and adjusting an I or Q signal based on the control loop.

FIG. 3 is a flow diagram illustrating an example of a process 300 for operating a control loop and adjusting an I or Q signal based on the control loop. The process 200 can be performed by a receiver, e.g., the radio receiver 105 of FIG. 1A.

The receiver determines, for each of multiple first digital samples, results of cross-correlations of the first digital sample with each of multiple second digital samples (302). As described above, the first digital samples can be the I samples or the Q samples and the second digital samples are the other of the I samples or the Q samples. If the I signal is being adjusted based on the cross-correlation results, the first digital samples are the I samples and the second digital samples are the Q samples. If the Q signal is being adjusted based on the cross-correlation results, the first digital samples are the Q samples and the second digital samples are the I samples. The I samples and the Q samples can be obtained as described above.

The multiple second digital samples can include a proper subset of the second digital samples. The multiple digital samples can include up to L second digital samples that are based on a time index of the first digital sample. For example, a first digital sample can have a time index n. For this first digital sample, the receiver can determine a cross-correlation result for up to L second digital samples having up to L different time indices. In a particular example, the receiver can determine a cross-correlation result for the following five time indices, n−2, n−1, n, n+1, and n+2. If the first digital samples are the Q samples, the receiver can determine a respective cross-correlation result between $q_n$ and $i_{n-2}$, $q_n$ and $i_{n-1}$, $q_n$ and $i_n$, $q_n$ and $i_{n+1}$, and $q_n$ and $i_{n+2}$.

The receiver can include a compensation system that has a control loop, e.g., a feedback or feedforward loop. In this example, the compensation system includes a feedback loop. The feedback loop can include, for each of the second digital samples, a correlator stage that determines the cross-correlation result for the second digital sample. As shown in FIG. 1B and described above, each correlator stage can include a first mixer, a second mixer, and a control element. Each correlator stage can determine respective cross-correlation results by cross-correlating its second digital samples with the first digital samples. In particular, each correlator stage can determine, for each of its second digital samples, an error signal that is the product of the first digital sample and the second digital sample. The correlator stage can integrate the error signals each time a new error signal is determined, e.g., for each new first digital sample, to arrive at the cross-correlation result.

The receiver operates the feedback loop based on the cross-correlation results (304). Each correlator stage can determine a cross-correlation result for each new first digital sample. As described above, the control element of the correlator stage can integrate the cross-correlation results over time and apply a gain to the integration result to determine the error signal.

Each correlator stage can then adjust each of its second digital samples using its cross-correlation result for that second digital sample and its corresponding first digital sample. Continuing the previous example, the correlator stage for the $i_{n-2}$ sample can determine, for each $q_n$ sample, a product of the $i_{n-2}$ sample that corresponds to the $q_n$ sample and the cross-correlation result for the $i_{n-2}$ correlator stage.

The receiver can then aggregate the adjusted second digital samples, e.g., by determining a sum of the adjusted second digital sample generated by each correlator stage. Continuing the previous example, the receiver can determine, for each $q_n$ sample, a sum of the adjusted $i_{n-2}$ sample, the adjusted $i_{n-1}$ sample, the adjusted $i_n$ sample, the $i_{n+1}$ sample, and the adjusted $i_{n+2}$ sample.

The receiver can then adjust the first digital sample based on the aggregated adjusted second digital samples. For example, the receiver can subtract, from the first digital sample, the aggregated adjusted second digital samples. This generates an adjusted first digital sample.

In operating the feedback loop, the receiver can use the adjusted first digital signal to determine updated cross-correlation results for the next iteration of the feedback loop. In each iteration, the feedback loop can determine updated error signals based on the adjusted first digital sample and use these updated error signals to adjust the cross-correlation results, e.g., by integrating over the previous error signals and the updated error signal. The receiver can operate the feedback loop until and after the error signals converge, e.g., to zero, such that the I-Q phase imbalance is eliminated or at least reduced.

The receiver adjusts the I signal or the Q signal based on the feedback loop (306). For example, the receiver can adjust the first digital sample using the aggregated adjusted second digital samples, as described above.

Figure 4:
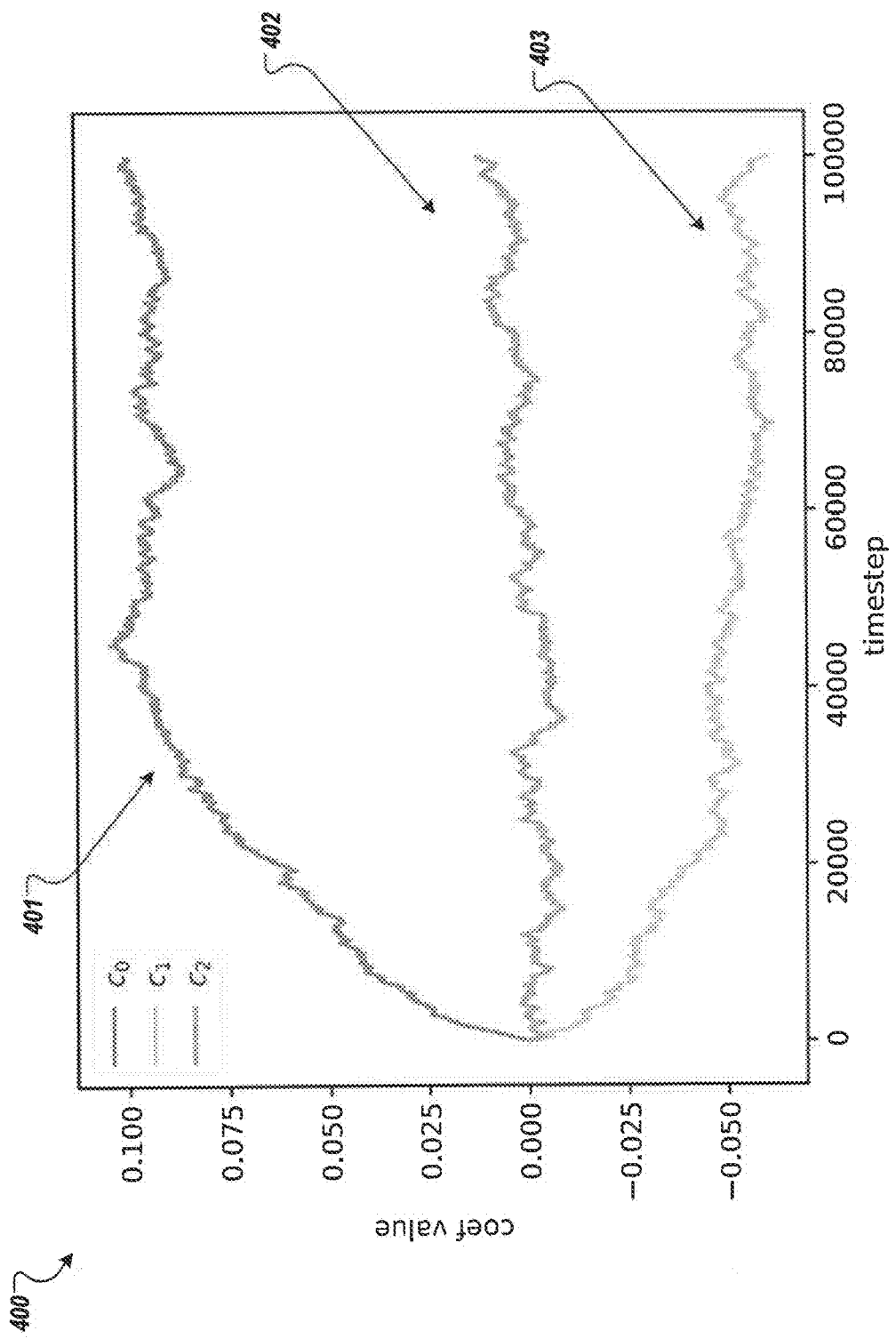
FIG. 4 is a graph that illustrates the convergence of error signals for compensating for frequency-dependent I-Q imbalance.

FIG. 4 is a graph 400 that illustrates the convergence of error signals for compensating for frequency-dependent I-Q imbalance. In this example, complex signal (e.g., random Gaussian noise) is generated. Then, a signal u is formed $v_n = u_n + 0.1\ \text{imag}(u_n) - 0.05\ \text{imag}(u_{n-1})$. That is, 0.1 of the Q signal is mixed into I signal, and −0.05 of the Q signal with a one sample time offset is mixed into the I signal. Then, the outputs of the correlator stages of the compensation system are plotted over time. The compensation system in this example includes three correlator stages (L=3).

The outputs are the error signals used to adjust the I signal. Each correlator stage adjusts its cross-correlation result until the cross-correlation result converges on the amount of the Q signal for that stage being imposed on the I signal. In this example, the amount of the Q signal being imposed on the I signal is the coefficient for that portion of the Q signal in the signal equation above. The graph 400 illustrates the cross-correlation results for the correlator stages over time. As shown in the graph 400, the cross-correlations results converge to the coefficients of the signal equation above. That is, the cross-correlation result 401 for no time offset converges to 0.1, the cross-correlation result 402 for a one sample time offset converges to 0.05, and the cross-correlation result 403 for a two sample offset (not imposed on the Q signal) correctly remains at zero.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A radio receiver, comprising:
an in-phase mixer configured to generate an in-phase (I) signal;
a quadrature mixer configured to generate a quadrature (Q) signal;
a first analog-to-digital (A/D) converter configured to generate first digital samples from one of the I signal and the Q signal;
a second analog-to-digital (A/D) converter configured to generate second digital samples from the other of the I signal and the Q signal; and
a compensation system comprising a control loop configured to compensate for frequency-dependent I-Q imbalance that varies across input signal component frequencies based on results, for each of multiple of the first digital samples, of cross-correlation of the first digital sample with each of multiple of the second digital samples, wherein at least one of the multiple second digital samples has a time index that is different from a time index of the first digital sample, and wherein the time indexes for the respective digital samples indicate time-based positions within the signals from which the digital samples were generated.

2. The radio receiver of claim 1, wherein:
the control loop comprises a plurality of correlator stages; and
each correlator stage generates a cross-correlation result by cross-correlating the first digital sample with a respective second digital sample of the multiple second digital samples.

3. The radio receiver of claim 2, wherein each correlator stage comprises a first mixer configured to generate a product of one of the first digital sample and the respective second digital sample.

4. The radio receiver of claim 3, wherein each correlator stage comprises:
a control element configured to generate the cross-correlation result, including integrating a plurality of the products generated by the first mixer over time; and
a second mixer configured to generate an adjusted second digital sample by multiplying the cross-correlation result by the second digital sample.

5. The radio receiver of claim 4, wherein the control loop comprises:
an aggregation element configured to aggregate a respective adjusted second digital sample received from each correlator stage; and an adjustment element configured to adjust the I signal or the Q signal based on the aggregated adjusted second digital samples.

6. The radio receiver of claim 2, wherein:
the control loop is configured to cross-correlate the first digital sample with the multiple second digital samples; and
the multiple second digital samples comprises a proper subset of the second digital samples, the proper subset having no more than a maximum number of second digital samples and the second proper subset is based on a time index of the first digital sample.

7. The radio receiver of claim 6, wherein the plurality of correlator stages comprises a respective correlator stage for each second digital sample in the proper subset.

8. The radio receiver of claim 1, wherein the control loop is configured to adjust a phase difference between the I signal and the Q signal to reduce deviation in the phase difference from 90 degrees.

9. The radio receiver of claim 1, wherein the compensation system is configured to apply different compensation for different carrier frequencies.

10. The radio receiver of claim 1, wherein the control loop is configured to adapt to changes in I-Q imbalance due to changes in temperature.

11. The radio receiver of claim 1, wherein:
the radio receiver is configured to change a frequency to which the radio receiver is tuned;
the change in frequency causes a change in the I-Q imbalance; and
the control loop is configured to compensate for the changed I-Q imbalance based on additional results, for each of multiple additional first digital samples, of cross-correlation of the first additional sample with each of multiple additional second digital samples.

12. The radio receiver of claim 1, wherein the control loop comprises a feedforward loop or a feedback loop.

13. The radio receiver of claim 1, wherein:
the control loop comprises a plurality of correlator stages and each correlator stage comprises:
a first mixer configured to generate a product of each first digital sample and each respective second digital sample;
a control element configured to generate the cross-correlation result, including integrating a plurality of the products generated by the first mixer over time; and
a second mixer configured to generate an adjusted second digital sample by multiplying the cross-correlation result by the second digital sample.

14. The radio receiver of claim 1, wherein the control loop comprises multiple correlator stages, each correlator stage corresponding to a different time offset between the first digital samples and the second digital samples, wherein each correlator stage is configured to:
generate a cross-correlation result by cross-correlating the first digital sample with a respective second digital sample having the time index corresponding to the time offset of the correlator stage; and
aggregate multiple cross-correlation results generated over time to generate an aggregated cross-correlation result that converges to an amount of interference imposed on the first signal by the respective second signals having the time index corresponding to the time offset of the correlator stage.

15. A method comprising:
receiving an input signal;

generating an in-phase (I) signal from the input signal and generating a quadrature (Q) signal generated from the input signal;

obtaining first digital samples from one of the I signal and the Q signal;

obtaining second digital samples from the other of the I signal and the Q signal;

compensating for frequency-dependent I-Q imbalance by:

determining, for each of multiple of the first digital samples, cross-correlations of the first digital sample with respect to each of multiple of the second digital samples, wherein at least one of the multiple second digital samples has a time index that is different from a time index of the first digital sample, and wherein the time indexes for the respective digital samples indicate time-based positions within the signals from which the digital samples were generated;

operating a control loop based on the cross-correlations; and adjusting the I signal or the Q signal based on the control loop.

16. The method of claim 15, wherein compensating for frequency-dependent I-Q imbalance comprises operating the control loop to adjust a phase difference between the I signal and the Q signal to reduce deviation in the phase difference from 90 degrees.

17. The method of claim 15, wherein compensating for the frequency-dependent I-Q imbalance comprises cross-correlating the first digital samples with each of a proper subset of the second digital samples, wherein the proper subset of the second digital samples includes multiple second digital samples and includes no more than a maximum number of second digital samples, and the proper subset of the second digital samples is based on a time index of the first digital sample.

18. The method of claim 15, wherein the first digital samples are respectively cross-correlated with samples in different proper subsets of the second digital samples, each of the proper subsets having a same predetermined number of samples that is greater than one.

19. The method of claim 15, wherein compensating for the frequency-dependent I-Q imbalance comprises cross-correlating each of the first digital samples with the second digital samples in a limited window corresponding to the first digital sample, the limited window having a position based on a time index of the first digital sample and including multiple second digital samples.

20. The method of claim 15, wherein compensating for the frequency-dependent I-Q imbalance comprises correlating a first digital sample having a particular time index with each second digital sample in a series of consecutive second digital samples in a range based on the particular time index.

21. The method of claim 15, wherein compensating for the frequency-dependent I-Q imbalance comprises correlating a first digital sample having a particular time index with each of a predetermined number of second digital samples in sequence beginning at the particular time index.

22. A non-transitory computer readable medium comprising instructions that, when executed by a data processing apparatus, cause the data processing apparatus to perform operations comprising:

receiving an input signal;

generating an in-phase (I) signal from the input signal and generating a quadrature (Q) signal generated from the input signal;

obtaining first digital samples from one of the I signal and the Q signal;

obtaining second digital samples from the other of the I signal and the Q signal;

compensating for frequency-dependent I-Q imbalance by:

determining, for each of multiple of the first digital samples, cross-correlations of the first digital sample with respect to each of multiple of the second digital samples, wherein at least one of the multiple second digital samples has a time index that is different from a time index of the first digital sample, and wherein the time indexes for the respective digital samples indicate time-based positions within the signals from which the digital samples were generated;

operating a control loop based on the cross-correlations; and adjusting the I signal or the Q signal based on the control loop.

* * * * *